2 Sheets—Sheet 1.

J. C. RUSSELL.
Vehicle.

No. 210,561. Patented Dec. 3, 1878.

Witnesses:
Clarence Poole
James A. Payne

Inventor:
John C. Russell,
by Geo. W. Dyer & Co.
Attys.

2 Sheets—Sheet 2.

J. C. RUSSELL.
Vehicle.

No. 210,561.     Patented Dec. 3, 1878.

Witnesses:
Clarence Poole
James A. Payne.

Inventor:
John C. Russell,
by Geo. W. Dyer & Co,
Attys.

UNITED STATES PATENT OFFICE.

JOHN C. RUSSELL, OF SALTER'S STATION, SOUTH CAROLINA.

IMPROVEMENT IN VEHICLES.

Specification forming part of Letters Patent No. 210,561, dated December 3, 1878; application filed October 28, 1878.

*To all whom it may concern:*

Be it known that I, JOHN C. RUSSELL, of Salter's Station, in the county of Williamsburg and State of South Carolina, have invented a new and useful Improvement in Vehicles; and I do hereby declare that the following is a full and exact description of the same, reference being had to the accompanying drawings, and to the letters of reference marked thereon.

The object I have in view is to produce a light and strong vehicle which can be used as a buggy or carriage, and can be easily converted into a sulky, the whole costing but little more than an ordinary carriage with the same finish, and forming a convenient and desirable vehicle when arranged for use in either capacity; and my invention therein consists, mainly, in providing the hind wheels of the vehicle with a sulky-frame, in combination with a detachable carriage or buggy body supported on the front wheels, and adapted to be secured to the sulky-frame and rear axle, so as to form a complete carriage or buggy; and, further, in the construction and arrangement of the several distinctive parts of my vehicle, as fully hereinafter explained.

Figure 1:
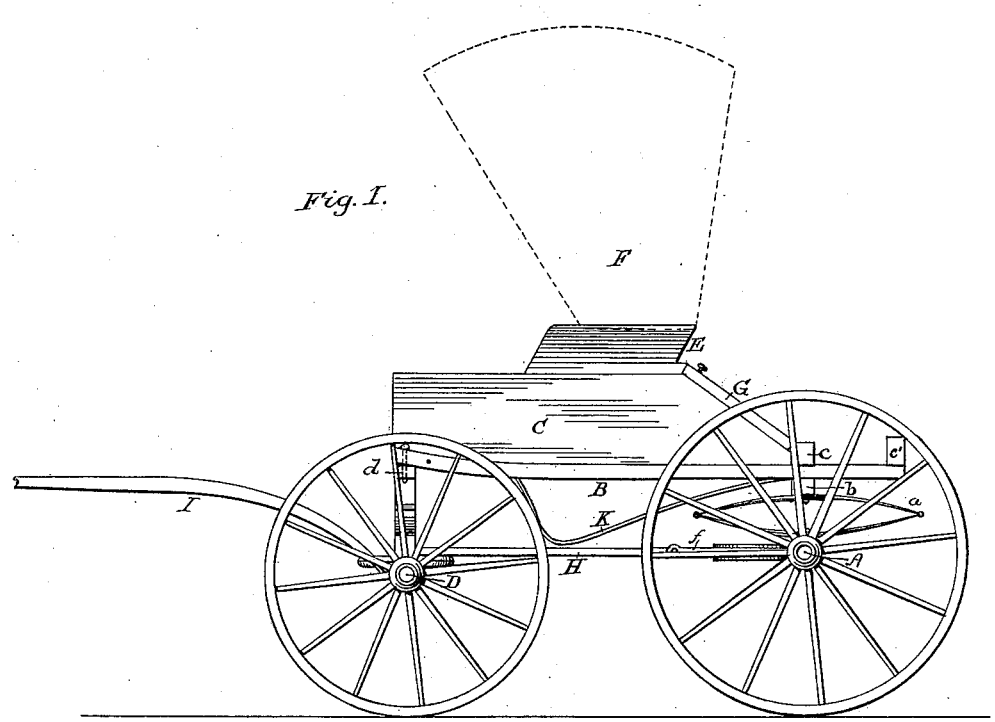
Figure 2:
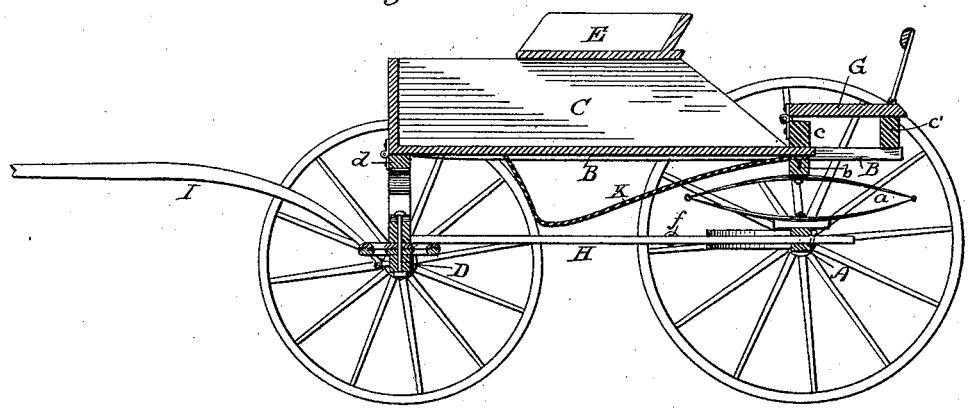
Figure 3:
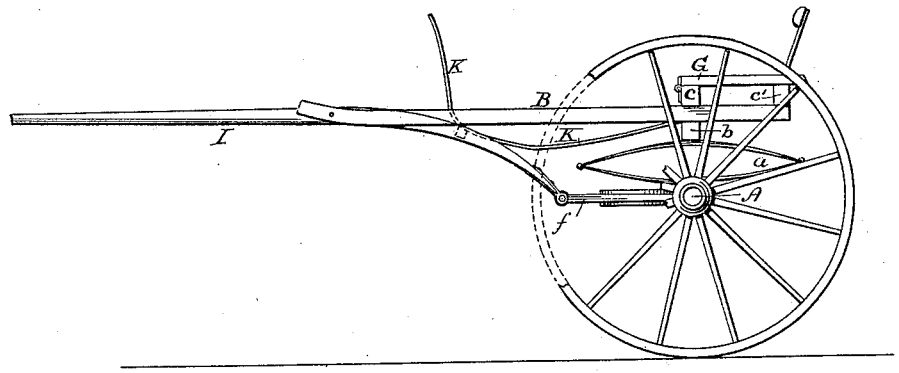
Figure 4:
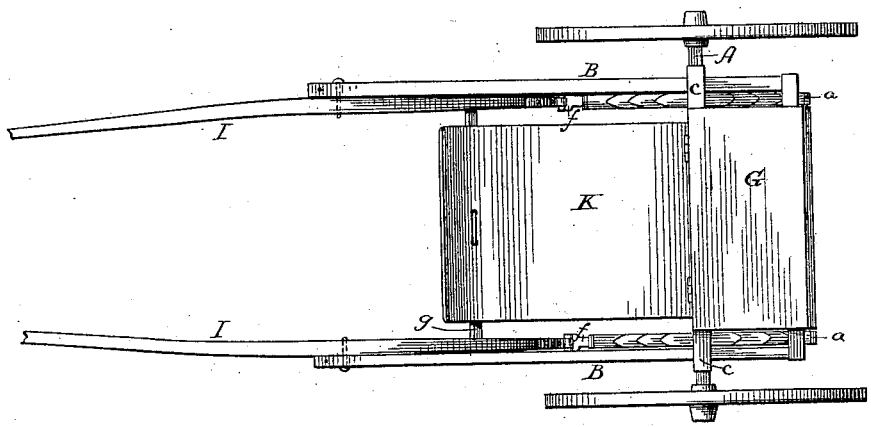

In the drawings, Figure 1 is a side elevation of the vehicle arranged as a single-seated buggy, with a carriage-top shown in dotted lines; Fig. 2, a vertical longitudinal section of the vehicle as a double-seated buggy; Fig. 3, a side view of the parts arranged as a sulky, and Fig. 4 a top view of the same.

Like letters denote corresponding parts.

A is the rear axle, having proper wheels, and carrying suitable springs $a$, (either one transverse or two longitudinal springs,) upon which the bolster $b$ is secured. The side bars B are bolted to the bolster, projecting forward to the front of the body C and a short distance to the rear of the bolster. The side bars are connected above the bolster by a cross-piece, $c$, and by one or more other cross-pieces, $c'$, if found desirable. The body C, of any convenient form, is supported at its forward end on the front axle, D, through intermediate fifth-wheel and spring, the bottom of the body being hinged to the forward bolster, $d$, as shown. The body fills the space between the side bars, and its bottom is extended to the rear to rest upon the rear bolster under the cross-piece $c$. The forward ends of the side bars rest upon and are removably secured to the ends of the forward bolster, $d$, where such ends project beyond the sides of the body.

The body is provided with a suitable seat, E, and may have a removable carriage-top, F, attached. The sides of the body are inclined at the rear, and the rear side of the box-body is closed, as shown in Fig. 1, by a folding panel, G, hinged to the cross-piece $c$. This panel can be thrown back upon the cross-piece $c'$ to form a rear seat, Fig. 2, and may have a folding back-rest hinged to it.

To the spring-block, above the fifth-wheel, is rigidly secured the reach-pole H, which extends to the rear, passing centrally through the hind hounds and through the rear axle, and secured by a spring key or screw. Instead of extending through the axle the reach may terminate in front of the same, and be removably coupled with the frame forming the hind hounds, which can be of any usual or convenient construction. The shafts I are attached to the front axle by suitable thill-couplings. Arms $f$ project forward from the rear axle, and have means for coupling with the shafts when the vehicle is in use as a sulky.

To the top of the rear bolster, $b$, is rigidly secured a wooden or sheet-iron sulky-bottom, K, which projects forward and downward, and has its front end turned up to form a dashboard. The sulky-bottom rests close to the under side of the body when the vehicle is arranged as a carriage or buggy, and has means for removably securing it to the whiffletree-bar $g$ of the shafts when they are coupled with the arms $f$. When in use as a single-seated buggy, the body is attached to the side bars and the shafts to the front axle, the panel G is thrown forward to close the rear of the box, and the vehicle takes the form shown in Fig. 1. By attaching the top F a covered buggy or single-seated carriage is obtained. With the top off, the panel G can be thrown back to form a double-seated buggy, Fig. 2.

To change the parts into a two-wheel sulky, the reach is uncoupled from the rear axle, (or hind hound-frame,) and the front bolster, $d$, disconnected from the side bars; then, by drawing forward on the shafts, the front wheels, the body, and the reach will be separated from the remaining parts of the vehicle. The shafts are then taken from the front axle and coupled with the arms $f$, and the bottom K is bolted to the bar $g$ of the shafts. The panel G is thrown back to form the seat, and the result is a strong and convenient sulky, Figs. 3 and 4.

The advantages of my invention are numerous, combining as it does in one vehicle three different conveyances, and making together a compact and well-appearing carriage.

Having thus fully described my vehicle and explained some of its advantages, what I claim as new therein, and desire to secure by Letters Patent, is—

1. In a vehicle, substantially as described, the carriage-body and front wheels, detachable together from the hind wheels, in combination with the sulky-frame, supported by the hind wheels, substantially as set forth and shown.

2. The seat G of the sulky-frame, forming the panel for the rear side of the buggy-body, substantially as described and shown.

3. The sulky-bottom K, secured to the rear bolster, and covered by the body C when the vehicle is used as a carriage or buggy, substantially as described and shown.

4. The body C, hinged to the forward bolster, $d$, and detachably connected with the rear part of the running-gear of the vehicle, substantially as described and shown.

5. The thill-coupling arms $f$, projecting from the rear axle, substantially as described and shown.

6. The combination, with the rear axle and springs, supporting the side bars B, of the body C, supported by the front axle, and detachably secured to such side bars, and the reach H, removably coupled with the hind axle or hound frame, substantially as described and shown.

This specification signed and witnessed this 16th day of October, A. D. 1878.

JOHN C. RUSSELL.

Witnesses:
JAS. A. FENEEL,
W. SALTERS.